Patented Jan. 31, 1950

2,496,227

UNITED STATES PATENT OFFICE 2,496,227

PRODUCTION OF DISPERSIONS OF REACTION PRODUCTS OF HALOGENATED PARAFFINS AND ALKALINE POLYSULFIDES

Herman Eilers, Johan Overhoff, and Johannes Cornelis Vlugter, Amsterdam, Netherlands, assignors to Shell Development Company, San Francisco, Calif., a corporation of Delaware No Drawing. Application July 22, 1947, Serial No. 762,806. In the Netherlands January 3, 1942

Section 1, Public Law 690, August 8, 1946
Patent expires January 3, 1962

15 Claims. (Cl. 260—29.2)

The present invention relates to the production of stable, highly concentrated dispersions of reaction products of halogenated paraffins and alkaline polysulfides and to the improved products thereby obtained.

High molecular weight plastic reaction products are obtained by reacting a halogenated hydrocarbon, such as a di-halogen substituted paraffin, with an alkaline polysulfide, in aqueous medium. By carrying out the reaction in the presence of a dispersing agent or a protective colloid aqueous dispersions or latices, resembling rubber latex are obtained. It has been found that such dispersions obtained by methods used heretofore will often continue to undergo a settling out of the dispersed phase during storage resulting in their separation into two layers, a clear aqueous supernatant layer and a bottom layer, comprising the disperse phase. Forming the two layers into a single uniform dispersion, once they have been formed, by such practical means as stirring or the like, is generally exceedingly difficult if not impossible. The supernatant layer consists of an aqueous solution of the salt reaction product formed as a by-product during the reaction. When dichloroethane is reacted with an alkali metal polysulfide the salt by-product formed will be the chloride of the alkali metal. The supernatant aqueous layer formed may be separated from the lower layer by decantation. Since, however, the salt content of the supernatant layer is only a part of the total salt by-product a substantial amount of salt will remain in the bottom layer comprising the dispersed phase.

It has been found that the instability of these dispersions is attributable to at least a substantial degree to the presence therein of the salt by-product. Consequently the bottom layer will continue to separate a clear supernatant aqueous salt solution from a bottom layer comprising the high molecular weight reaction product. Continued separation of a supernatant aqueous salt solution generally results in a conglomeration of particles of high molecular weight reaction product in the remaining bottom layer, which conglomerated particles are then finally converted into an irreversible coagulum.

Sedimentation of the dispersed particles with resultant formation of the supernatant aqueous salt solution is attributable to at least a substantial degree to the fact that the dispersed particles of high molecular weight reaction products are in a flocculant state in the aqueous medium of the dispersion in the presence of the salt concentration prevailing therein. This appears to be evidenced by the fact that upon dilution of the reaction mixture with copious amounts of water no stratification appears to take place, whereas restoration of the salt concentration to that prevailing in the reaction mixture generally obtained again enables stratification into a clear aqueous salt layer and a lower layer comprising the high molecular weight reaction products.

It is an object of the present invention to provide an improved process for the more efficient production of aqueous dispersions of the high molecular weight reaction products obtained by reacting a di-halogen substituted paraffin with an alkaline polysulfide wherein the above difficulties are obviated to at least a substantial degree.

It is a further object of the invention to provide an improved process for the efficient production of aqueous dispersions of high molecular weight reaction products obtained by reacting a di-halogen substituted paraffin with an alkaline polysulfide containing not only high concentrations of dispersed solids but possessing substantially improved stability.

Another object of the invention is the provision of an improved process for the efficient production of aqueous dispersions of the high molecular weight reaction products obtained by the interaction of a di-halogen substituted paraffin with an alkaline polysulfide, which dispersions are of improved stability, devoid of any substantial amount of particles in the flocculated state and comprise substantially all of the dispersed solids in a peptized irreversibly dispersed state. Other objects and advantages of the invention will become apparent from the following description thereof.

In accordance with the process of the invention the improved highly concentrated aqueous dispersions of stable character are obtained by reacting a di-halogen substituted paraffin with an alkaline polysulfide in an aqueous medium in the presence of a dispersing agent, thereby forming high molecular weight plastic reaction products dispersed in an aqueous inorganic salt solution, adding an electrolyte providing a polyvalent cation to the dispersion thus obtained, thereby effecting a relatively rapid flocculation of the dispersed solids and a separation of the mixture into a supernatant layer comprising an aqueous salt solution and a lower layer comprising flocculated high molecular weight reaction products and the added polyvalent cation, separating the aqueous supernatant layer from the lower layer, and removing the cation from the remaining lower layer thereby converting said lower layer into an irreversible highly concentrated aqueous dispersion.

The halogenated hydrocarbons used as starting material in the production of the stable dispersions in accordance with the invention comprise the di-halogenated paraffins from any available source. They may be obtained, for example, by the additional halogenation of olefins, the substitutive halogenation of paraffins, or the halogenation of hydrocarbon fractions comprising substantial amounts of olefins and/or paraffins. The suitable di-halogenated paraffins comprise the chlorine, bromine, and iodine derivatives of the paraffinic hydrocarbons. Illustrative of the class of di-halogenated paraffins employed are, for example, dichloromethane, dichloroethane, 1-chloro-3-bromopropane, ethylene-dibromide, the chlorinated hydrocarbons obtained by the subjection to additive chlorination of olefin-containing cracked hydrocarbon fractions, etc. Of the broad class of di-halogenated paraffins the di-halogen derivatives of the normally gaseous paraffins are preferred.

By the term "alkaline polysulfide" as used throughout this specification and claims is meant the alkali-, alkaline earth- and ammonium-polysulfides, as well as the polysulfides of organic bases. Illustrative of the broad class of suitable polysulfides are the polysulfides of sodium, potassium, calcium, strontium, barium, ammonia, triethanolamine, and the like.

The di-halogenated paraffin such as, for example, dichloroethane, is reacted with the alkaline polysulfide, such as, for example, sodium polysulfide, at a temperature ranging from room temperature to about 100° C. Temperatures in the range of from about 60° C. to about 80° C. are generally preferred. At temperatures below 60° C. the time of reaction is generally too long, whereas the utilization of temperatures substantially above 80° C. necessitates the use of elevated pressures. The use of a temperature of about 70° C. is particularly preferred. The di-halogenated paraffin and the alkaline polysulfide are reacted in aqueous medium in substantially equimolecular amounts. In a preferred method of carrying out the process a slight molar excess, for example, about $\frac{1}{10}$ mol excess, of the di-halogenated paraffin over the alkaline polysulfide present is employed. The alkaline polysulfide is generally added in the form of a solution, for example, a 0.5 mol aqueous solution. A sufficient amount of water as reaction medium is generally employed to maintain the concentration of the alkaline polysulfide between about 0.3 mol and 1 mol per liter of reaction mixture. It has been found that maintaining the concentration of the alkaline polysulfide substantially below the indicated value of 0.3 mol per liter of reaction mixture will often render more difficult a rapid or complete stratification of the product, or the separation by centrifuging of a clear salt solution therefrom. On the other hand maintaining the concentration of the alkaline polysulfide above about 1 mol per liter of reaction mixture will often occasion the formation of coarse particles in the resulting dispersion.

In order to obtain the dispersions of substantially improved characteristics of the present invention the reaction of the di-halogen substituted paraffin with the alkaline polysulfide is executed in the presence of a suitable dispersing agent. Although the invention is in no wise limited to the use of a particular type of dispersing agent during the execution of the initial reaction of the process, superior results are obtained by the use of a dispersing agent consisting essentially of a water-soluble salt of a sulfuric acid ester as disclosed in co-pending application Serial Number 760,922 filed July 14, 1947. Examples of such preferred dispersing agents are: the sulfuric acid ester salts of the straight and branched chain decenes, hendecenes, dodecenes, tridecenes, tetradecenes, pentadecenes, hexadecenes, heptadecenes, octadecenes, decanols, hendecanols, dodecanols, tridecanols, tetradecanols, pentadecanols, hexadecanols, heptadecanols, octadecanols, and the corresponding unsaturated alcohols. The dispersion agents employed need not necessarily consist of but one salt of a sulfuric acid ester and a mixture consisting of two or more such salts may suitably be employed. A particularly desirable mixture of sulfuric acid ester salts comprises the mixed sulfuric acid ester salts obtained by treating with sulfuric acid under esterifying conditions an olefinic hydrocarbon fraction containing olefins having from 10 to 18 carbon atoms to the molecule, such as obtained, for example, by the cracking of paraffin wax, and saponifying the resulting mixed ester with a suitable alkaline earth, alkali or ammonium hydroxide to obtain therefrom a mixture of salts of sulfuric acid esters of the olefins.

The amount of dispersion agent added to the reaction mixture may vary within the scope of the invention in accordance with the particular reactants and dispersion agent employed. In general, the addition of the dispersion agent in amounts less than about 5%, and often below about 3% by weight of the reaction mixture, will result in the attainment of dispersions possessing the improved characteristics. Greater amounts of the dispersion agents may be employed, however, within the scope of the invention.

The reaction time employed will vary within the scope of the invention depending upon the nature of the reactants and the conditions employed. Reaction times ranging from about ½ to about 5 hours, and generally from about 1 to about 2 hours, have been found satisfactory.

The reaction mixture thus obtained will comprise not only a high molecular weight plastic reaction product the component structural parts of which are sulfur atoms and the hydrocarbon radicals of the halogenated paraffins charged, but also a salt by-product formed by the combination of the halogen atom of the halogenated paraffin with the alkaline radical of the alkaline polysulfide. When reacting dichloroethane with sodium polysulfide the salt by-product will be sodium chloride. As pointed out above the instability of the dispersion thus obtained is attributable to at least a substantial degree to the presence therein of the salt in sufficient amount to induce flocculation of the high molecular weight reaction product over prolonged periods of time. Though some of the salt may be removed by such steps as stratification and removal of the aqueous salt layer thus formed, the resulting dispersed phase-containing layer produced will continue to hold sufficient salt to render the dispersions unstable and to cause the subsequent coagulation of the dispersed solids and their conversion to an irreversible coagulum. Methods disclosed heretofore to effect the removal of the salt therefrom are generally not only time-consuming or complex but generally result in dispersions lacking in a high concentration of solids and stability.

In accordance with the process of the invention removal of the salt by-product is effected efficiently on a practical scale under conditions assuring the absence of any concentration of salt remaining in the dispersions approaching or exceeding the concentration necessary to cause the flocculation and agglomeration of the dispersed solids. Substantially complete removal of the salt by-product is effected in accordance with the invention by the addition to the reaction products, comprising the high molecular weight reaction product in admixture with the aqueous salt solution, of an electrolyte providing a multi-valent cation in sufficient amount to effect rapid flocculation and sedimentation of the dispersed high molecular weight reaction product. Suitable electrolytes which may be employed comprise the water-soluble salts of the polyvalent metals more electro-negative than sodium in the displacement series of the elements. These comprise, for example, the water soluble salts of barium, strontium, magnesium, gallium, aluminum, tin, arsenic, chromium, tellurium, uranium, etc. such as, for example, barium bromide, barium chloride, barium cyanide, barium formate, barium persulfate, calcium bromate, calcium chloride, calcium chromate, calcium thiocarbonate, cesium dioxide, cesium oxide, cesium nitrite, strontium bromide, strontium chloride, strontium iodate, strontium iodide, aluminum bromide, aluminum chloride, aluminum fluoride, aluminum iodide, aluminum nitrate, magnesium permanganate, magnesium selenate, magnesium thiosulfate, etc. preferred electrolytes comprise the water-soluble salts of the alkaline earth metals and of aluminum. Of these the water-soluble salts of calcium such as for example calcium chloride, calcium nitrate, etc. are particularly preferred. The particular elecrolyte employed will vary with the particular conditions employed and the composition of the reaction mixture. Thus the use of an electrolyte providing cations capable of reacting with components of the reaction mixture under the conditions employed are obviously avoided.

The poly-valent cation-providing electrolytes are preferably added to the dispersions in the form of aqueous solutions. The amount of the electrolyte added will vary within the scope of the invention and depends to some extent upon the composition of the dispersion, the specific electrolyte employed and the rate of flocculation and subsequent sedimentation desired. At least a sufficient amount of the electrolyte is however added to assure substantially complete flocculation of the high molecular weight reaction product particles in the dispersion. The minimum amount of a specific electrolyte required to effect substantially complete flocculation of the dispersed particles is readily determined by experimentation. Although the addition of an excess of the electrolyte may be resorted to within the scope of the invention, superior dispersions of optimum stability are obtained by the addition of the electrolyte in an amount at least equal to, but not substantially exceeding, the amount required to obtain substantially complete flocculation of the dispersed high molecular weight reaction products.

Upon addition of the electrolyte, for example, aqueous calcium chloride, the mixture is separated by stratification into a supernatant aqueous layer comprising at least a substantial amount of the salt by-product and a lower layer comprising the high molecular weight reaction product in admixture with the di-valent or multi-valent cations which when employing calcium chloride will be calcium ions. The supernatant aqueous layer is separated, for example, by decantation. Further separation of a supernatant aqueous layer may often be occasioned by stirring the remaining bottom layer. Such additionally formed supernatant layer is again removed, for example, by decantation.

The electrolyte may be added directly to the reaction mixture obtained or may be added to a more concentrated dispersion obtained by initially separating aqueous salt solution from the reaction mixture by stratification and decantation. If desired the more concentrated dispersion thus obtained may be subjected to a washing operation with a suitable washing medium such as water prior to addition of the electrolyte. The addition of the electrolyte and flocculation of the dispersed particles are, however, preferably executed in dilute aqueous medium. To this effect water is preferably initially added to the more concentrated dispersion obtained by separation of an aqueous layer before adding the electrolyte.

Stepwise addition of the electrolyte with intermediate separation of an aqueous layer or resort to a consecutive plurality of treatments with the same or different electrolytes may be resorted to within the scope of the invention.

Upon separation of the aqueous layer the remaining concentrated bottom layer, comprising the flocculated high molecular weight particles and the poly-valent cations is treated to effect the removal of the poly-valent cations therefrom, thereby converting the flocculated particles to irreversibly dispersed particles. Removal of the cations may be effected by methods involving either the conversion of the poly-valent cation to non-ionic form as by compound or complex formation which compound or complex may then remain in the dispersion or by actual separation of the poly-valent element from the dispersion. The invention is in no wise limited to any specific method of removing the poly-valent cation from the dispersion. Thus, the cation may be removed by the addition of agents converting the cation to components of water-soluble or water-insoluble salts. Thus calcium cations provided by use of calcium chloride as electrolyte are suitably removed by the addition of a compound, such as, for example, ammonium oxalate, converting the calcium cations to insoluble calcium oxalate which remains in the product in the form of a very finely divided dispersion which in no wise detracts from the advantageous properties of the dispersions comprising it.

In another method of removing the cations agents are added capable of converting them to water-soluble complexes also innocuous to behavior and advantageous characteristics of the dispersions. Thus the calcium cations are suitably removed by the addition to the flocculated admixture comprising them of a compound such as sodium hexametaphosphate in aqueous solution resulting in the formation of a water-soluble complex of the calcium and the added agent, which complexes are stable and incapable of splitting off the flocculation inducing cations.

Under the above defined conditions dispersions of the high molecular weight reaction products obtained by reaction of a di-halogenated paraffin with an alkaline polysulfide are readily produced having a solid content of at least thirty per cent by weight and possessing substantially improved stability. The highly concentrated dispersions obtained in accordance with the process of the invention enable the attainment of films therefrom which are superior in all respects to films obtained from dispersions of similar compositions comprising substantial amounts of the salt by-product. Thus in comparison with films obtained from dispersions from which the salt by-product has not been thus thoroughly removed the films obtained in accordance with the invention are found to possess greater cohesion and elasticity and are found to be more water repellent and superior in appearance.

The following examples are illustrative of the production of the improved highly concentrated stable dispersions in accordance with the invention:

*Example I*

Dichloroethane was reacted with an aqueous 0.5 mol solution of sodium polysulfide at a temperature of 70° C. while stirring vigorously. A slight molal excess of dichloroethane over sodium polysulfide was employed. The reaction was executed in the presence of 0.3% by weight of the aqueous reaction mixture of a dispersing agent consisting essentially of a mixture of sodium salts of sulfuric acid esters of olefines having from 10 to 18 carbon atoms to the molecule (obtained by the vapor phase cracking of paraffin wax).

Due to the presence in the resulting reaction products of by-product sodium chloride in an amount sufficient to effect flocculation of the dispersed high molecular weight reaction product, a sedimentation of the high molecular weight reaction products was obtained with the separation of a clear supernatant aqueous salt layer. The supernatant aqueous salt layer was separated from the bottom layer by decantation.

To 100 kg. of the bottom layer thus formed, containing approximately 45 kg. of high molecular weight reaction products and approximately 2.5 kg. of sodium chloride, there was added 420 liters of water containing 420 grams of calcium chloride. Substantially complete flocculation of the high molecular weight reaction product occurred.

Upon standing, stratification of the mixture occurred with the formation of a supernatant layer of aqueous salt solution. The supernatant layer, consisting of about 410 liters, was separated from the bottom layer by siphoning. To the remaining bottom layer, consisting of about 140 kg. and containing now no more than approximately 0.5 kg. of sodium chloride, there was added 800 cc. of 5% aqueous ammonium oxalate solution. A dispersion of high stability having a solid content in excess of 30% was thereby obtained containing calcium oxalate in finely divided dispersed state. The calcium oxalate in no wise adversely affected the stability or other desirable properties of the highly concentrated dispersion thus obtained.

*Example II*

To a calcium chloride treated bottom layer obtained as described above in Example I, there was added another 450 kg. of water containing 400 kg. calcium chloride, a renewed flocculation of the high molecular weight dispersed particles and formation of a supernatant aqueous layer was thereby obtained. The supernatant layer thus formed was again removed by decantation and a bottom layer consisting of about 140 kg. was obtained comprising the high molecular weight reaction product in a flocculated state and containing now only about 0.125 kg. of chloride salts calculated as sodium chloride.

To the resulting bottom layer, twice treated with calcium chloride, thus obtained there was added 250 g. of sodium hexametaphosphate dissolved in 1 liter of water. A stable highly concentrated dispersion was thereby obtained having a solid content in excess of 30% by weight. The resulting dispersion thus obtained contained less chlorides than the stable dispersion of Example I and was furthermore free of any crystalline phase such as calcium oxalate.

We claim as our invention:

1. The process for the production of finely divided, highly concentrated, stable dispersions of the high molecular weight reaction products obtained by the interaction of dischloroethane with sodium polysulfide in an aqueous medium in the presence of a dispersing agent, which comprises adding calcium chloride to said aqueous high molecular weight reaction products, thereby effecting the flocculation of said high molecular weight reaction product with the separation of a supernatant layer comprising aqueous sodium chloride solution from a bottom layer comprising flocculated high molecular weight reaction products in admixture with calcium ions, separating said supernatant layer from said bottom layer, and removing said calcium ions from the bottom layer, thereby converting said bottom layer to a highly concentrated stable irreversible dispersion.

2. The process for the production of finely divided, highly concentrated, stable dispersions of the high molecular weight reaction products obtained by the interaction of dichloroethane with sodium polysulfide in an aqueous medium in the presence of a dispersing agent, which comprises adding a water-soluble calcium salt to said aqueous high molecular weight reaction product, thereby effecting the flocculation of said high molecular weight reaction product with the separation of a supernatant layer comprising aqueous sodium chloride solution from a bottom layer comprising flocculated high molecular weight reaction products in admixture with calcium ions, separating said supernatant layer from said bottom layer, and removing said calcium ions from the bottom layer, thereby converting said bottom layer to a highly concentrated stable irreversible dispersion.

3. The process for the production of finely divided, highly concentrated, stable dispersions of the high molecular weight reaction products obtained by the interaction of dichloroethane with sodium polysulfide in an aqueous medium in the presence of a dispersing agent, which comprises adding a water-soluble salt of an alkaline earth metal to said aqueous high molecular weight reaction product, thereby effecting the flocculation of said high molecular weight reaction product with the separation of a supernatant layer comprising aqueous sodium chloride solution from a bottom layer comprising flocculated high molecular weight reaction products in admixture with alkaline earth metal ions, separating said supernatant layer from said bottom layer, and removing said alkaline earth metal cations from the bottom layer thereby converting said bottom layer to a highly concentrated stable irreversible dispersion.

4. The process for the production of finely divided, highly concentrated, stable dispersions of the high molecular weight reaction products obtained by the interaction of dichloroethane with sodium polysulfide in an aqueous medium in the presence of a dispersing agent, which comprises adding an inorganic electrolyte providing a multi-valent cation to said aqueous high molecular weight reaction product, thereby effecting the flocculation of said high molecular weight reaction product with the separation of a supernatant layer comprising aqueous sodium chloride solution from a bottom layer comprising flocculated high molecular weight reaction products in admixture with multi-valent cations, separating said supernatant layer from said bottom layer, and removing said cations from the bottom layer, thereby converting said bottom layer to a highly concentrated stable irreversible dispersion.

5. The process for the production of finely divided, highly concentrated, stable dispersions of the high molecular weight reaction products obtained by the interaction of a dichlor-substituted normally gaseous paraffin with sodium polysulfide in an aqueous medium in the presence of a dispersing agent, which comprises adding calcium chloride to said aqueous high molecular weight reaction product, thereby effecting the flocculation of said high molecular weight reaction product with the separation of a supernatant layer comprising aqueous sodium chloride solution from a bottom layer comprising flocculated high molecular weight reaction products in admixture with calcium ions, separating said supernatant layer from said bottom layer, and removing said calcium ions from the bottom layer, thereby converting said bottom layer to a highly concentrated stable irreversible dispersion.

6. The process for the production of finely divided, highly concentrated, stable dispersions of the high molecular weight reaction products obtained by the interaction of a dichlor-substituted normally gaseous paraffin with sodium polysulfide in an aqueous medium in the presence of a dispersing agent, which comprises adding a water soluble calcium salt to said aqueous high molecular weight reaction product, thereby effecting the flocculation of said high molecular weight reaction product with the separation of a supernatant layer comprising aqueous sodium chloride solution from a bottom layer comprising flocculated high molecular weight reaction products in admixture with calcium ions, separating said supernatant layer from said bottom layer, and removing said calcium ions from the bottom layer, thereby converting said bottom layer to a highly concentrated stable irreversible dispersion.

7. The process for the production of finely divided, highly concentrated, stable dispersions of the high molecular weight reaction products obtained by the interaction of a dichlor-substituted normally gaseous paraffin with sodium polysulfide in an aqueous medium in the presence of a dispersing agent, which comprises adding a water-soluble alkaline-earth metal salt to said aqueous high molecular weight reaction product, thereby effecting the flocculation of said high molecular weight reaction product with the separation of a supernatant layer comprising aqueous sodium chloride solution from a bottom layer comprising flocculated high molecular weight reaction products in admixture with alkaline earth metal cations, separating said supernatant layer from said bottom layer, and removing said alkaline earth metal cations from the bottom layer, thereby converting said bottom layer to a highly concentrated stable irreversible dispersion.

8. The process for the production of finely divided, highly concentrated, stable dispersions of the high molecular weight reaction products obtained by the interaction of a dichlor-substituted normally gaseous paraffin with sodium polysulfide in an aqueous medium in the presence of a dispersing agent, which comprises adding an inorganic electrolyte providing a multi-valent cation to said aqueous high molecular weight reaction product, thereby effecting the flocculation of said high molecular weight reaction product with the separation of a supernatant layer comprising aqueous sodium chloride solution from a bottom layer comprising flocculated high molecular weight reaction products in admixture with multi-valent cations, separating said supernatant layer from said bottom layer, and removing said multi-valent cations from the bottom layer, thereby converting said bottom layer to a highly concentrated stable irreversible dispersion.

9. The process for the production of finely divided, highly concentrated, stable dispersions of the high molecular weight reaction products obtained by the interaction of a dichlor-substituted paraffin with an alkaline polysulfide in an aqueous medium in the presence of a dispersing agent, which comprises adding a water-soluble calcium salt to said aqueous high molecular weight reaction product thereby effecting the flocculation of said high molecular weight reaction product with the separation of a supernatant layer comprising aqueous salt solution from a bottom layer comprising flocculated high molecular weight reaction products in admixture with calcium ions, separating said supernatant layer from said bottom layer, and removing said calcium ions from the bottom layer, thereby converting said bottom layer to a highly concentrated stable irreversible dispersion.

10. The process for the production of finely divided, highly concentrated, stable dispersions of the high molecular weight reaction products obtained by the interaction of a dichlor-substituted paraffin with an alkaline polysulfide in an aqueous medium in the presence of a dispersing agent, which comprises adding a water-soluble salt of an alkaline earth metal to said aqueous high molecular weight reaction product, thereby effecting the flocculation of said high molecular weight reaction product with the separation of a supernatant layer comprising an aqueous salt solution from a bottom layer comprising flocculated high molecular weight reaction products in admixture with alkaline earth metal cations, separating said supernatant layer from said bottom layer, and removing said alkaline earth metal cations from the bottom layer, thereby converting said bottom layer to a highly concentrated stable irreversible dispersion.

11. The process for the production of finely divided, highly concentrated, stable dispersions of the high molecular weight reaction products obtained by the interaction of a dichlor-substituted paraffin with an alkaline polysulfide in an aqueous medium in the presence of a dispersing agent, which comprises adding an inorganic electrolyte providing a multi-valent cation to said aqueous high molecular weight reaction product, thereby effecting the flocculation of said high molecular weight reaction product with the separation of a supernatant layer comprising aqueous salt solution from a bottom layer comprising flocculated high molecular weight reaction products in admixture with multi-valent cations, separating said supernatant layer from said bottom layer, and removing said cations from the bottom layer, thereby converting said bottom layer to a highly concentrated stable irreversible dispersion.

12. The process for the production of finely divided, highly concentrated, stable dispersions of the high molecular weight reaction products obtained by the interaction of a di-halogen substituted normally gaseous paraffin with sodium polysulfide in an aqueous medium in the presence of a dispersing agent, which comprises adding a water-soluble calcium salt to said aqueous high molecular weight reaction product, thereby effecting the flocculation of said high molecular weight reaction product with the separation of a supernatant layer comprising aqueous sodium halide solution from a bottom layer comprising flocculated high molecular weight reaction products in admixture with calcium ions, separating said supernatant layer from said bottom layer, and removing said calcium ions from the bottom layer, thereby converting said bottom layer to a highly concentrated stable irreversible dispersion.

13. The process for the production of finely divided, highly concentrated, stable dispersions of the high molecular weight reaction products obtained by the interaction of a di-halogen substituted paraffin with an alkaline polysulfide in an aqueous medium in the presence of a dispersing agent, which comprises adding a water-soluble calcium salt to said aqueous high molecular weight reaction product, thereby effecting the flocculation of said high molecular weight reaction product with the separation of a supernatant layer comprising aqueous salt solution from a bottom layer comprising flocculated high molecular weight reaction products in admixture with calcium ions, separating said supernatant layer from said bottom layer, and removing said calcium ions from the bottom layer, thereby converting said bottom layer to a highly concentrated stable irreversible dispersion.

14. The process for the production of finely divided, highly concentrated, stable dispersions of the high molecular weight reaction products obtained by the interaction of a di-halogen substituted paraffin with an alkaline polysulfide in an aqueous medium in the presence of a dispersing agent, which comprises adding a water-soluble salt of an alkaline earth metal to said aqueous high molecular weight reaction product, thereby effecting the flocculation of said high molecular weight reaction product with the separation of a supernatant layer comprising aqueous salt solution from a bottom layer comprising flocculated high molecular weight reaction products in admixture with alkaline earth metal cations, separating said supernatant layer from said bottom layer, and removing said cations from the bottom layer, thereby converting said bottom layer to a highly concentrated stable irreversible dispersion.

15. The process for the production of finely divided, highly concentrated, stable dispersions of the high molecular weight reaction products obtained by the interaction of a di-halogen substituted paraffin with an alkaline polysulfide in an aqueous medium in the presence of a dispersing agent, which comprises adding an inorganic electrolyte providing a multi-valent cation to said aqueous high molecular weight reaction product, thereby effecting the flocculation of said high molecular weight reaction product with the separation of a supernatant layer comprising aqueous salt solution from a bottom layer comprising flocculated high molecular weight reaction products in admixture with multi-valent cations, separating said supernatant layer from said bottom layer, and removing said cations from the bottom layer, thereby converting said bottom layer to a highly concentrated stable irreversible dispersion.

HERMAN EILERS.
JOHAN OVERHOFF.
JOHANNES CORNELIS VLUGTER.

REFERENCES CITED

The following references are of record in the file of this patent:

UNITED STATES PATENTS

| Number | Name | Date |
|---|---|---|
| 2,012,347 | Patrick | Aug. 27, 1935 |